Dec. 5, 1933.  J. SCHOENFELD  1,938,113
ICE CREAM CONE
Filed Dec. 21, 1931
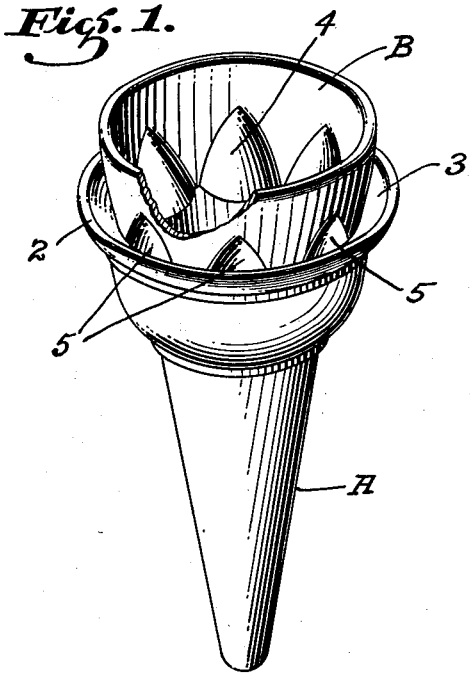
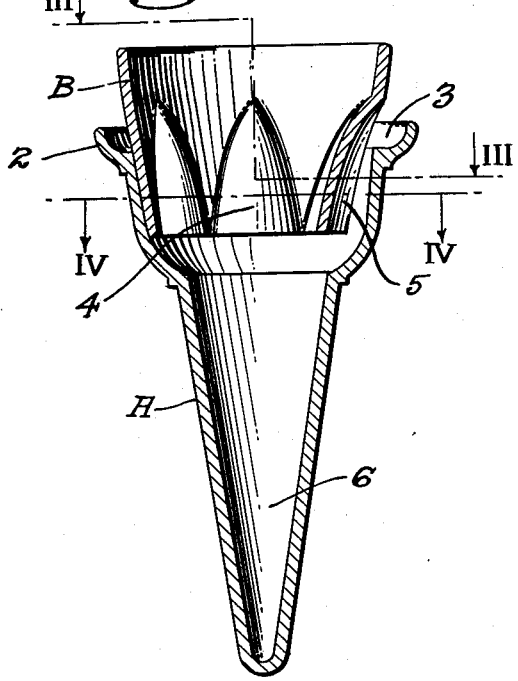
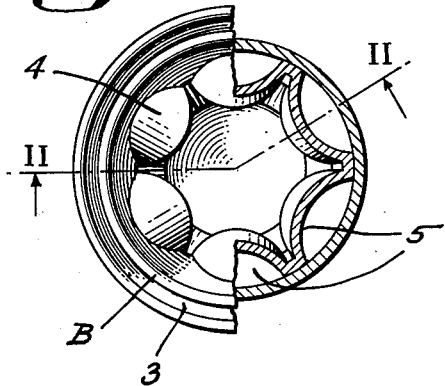
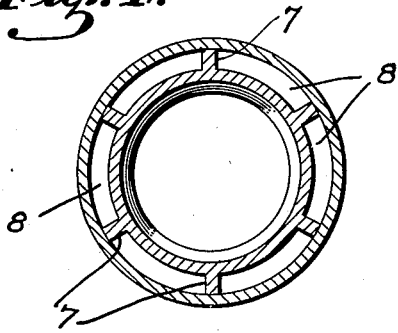
INVENTOR
Joseph Schoenfeld.
BY Townsend & Loftus
ATTORNEYS.

Patented Dec. 5, 1933

1,938,113

UNITED STATES PATENT OFFICE 1,938,113

ICE CREAM CONE

Joseph Schoenfeld, San Francisco, Calif.

Application December 21, 1931
Serial No. 582,227

1 Claim. (Cl. 99—10)

This invention relates to edible containers and especially that type known as ice cream cones.

Ice cream cones are made of edible material, such as batter or paste, baked to a golden brown color. They are usually cone-shaped and when ice cream, or a similar condiment, is to be served it is molded and packed into the upper end of the cone. A considerable portion of the ice cream projects above the upper end of the cone and a portion also projects beyond the rim of the cone, hence when the ice cream begins to melt it tends to run down the outer surface causing dripping, soiling of the fingers, clothing, etc.

The object of the present invention is to generally improve and simplify the construction and operation of edible containers of the character described; to provide a cone-shaped container which is so constructed that soiling of the fingers and clothing is substantially prevented; and further, and more specifically stated, to provide a container which consists of two cones inserted one within the other, the exterior cone having an outwardly flaring flange formed at its upper end which, together with the inner cone, forms an annular trough to collect the melting ice cream running down the exterior surface of the inner cone, and said inner cone having corrugations or grooves formed in its exterior surface to provide drain passages in communication with the trough so as to direct the melted material into the interior of the cone where it will run down the inner surface and finally collect in the bottom of the cone.

The edible container forming the subject matter of the present invention is shown by way of illustration in the accompanying drawing, in which—

Fig. 1 is a perspective view of the container showing the inner cone partially broken away.

Fig. 2 is a central vertical longitudinal section taken on line II—II of Fig. 3.

Fig. 3 is a plan view partially in section, said section being taken on line III—III of Fig. 2.

Fig. 4 is a cross section taken on line IV—IV, but showing the modification of the structure.

Referring to the drawing in detail and particularly Figs. 1 and 2, it will be noted that the cone is made in two sections, or from two separate cones, generally indicated at A and B. The exterior cone A is provided with an outwardly flaring annular flange 2 which, together with the inner cone B, forms an annular trough 3 to collect melting ice cream, or the like, running down the exterior surface of the inner cone B. The inner cone is in reality merely a section of a cone as it is open at both ends. Its lower end is corrugated or indented, as indicated at 4, and as such forms a plurality of drain passages 5 whereby melted cream or the like collected in the trough may be directed into the bottom portion 6 of cone A.

In actual manufacture the two cones will be separately baked. The exterior surface of the cone B will have a given taper and so will the interior surface of the upper end of the cone A. Hence, when the cones have been baked, cone B may be slipped into the upper end of cone A and as the surfaces have the same taper a snug fit will be maintained. Under ordinary practice a sufficient frictional grip is obtained to prevent separation of the cones but, if desired, an edible adhesive may be applied between the surfaces such, for instance, as a syrup, or the like.

In Figs. 1, 2 and 3, drain passages between the trough and the interior of the main cone A are maintained by corrugating or indenting the lower end of the cone B as shown at 4, but a similar result may be obtained, as shown in Fig. 4, by merely forming ribs 7 on the exterior surface of the inner cone B. These ribs maintain a spacing between the two cones and drain passages 8 are, accordingly, formed which will function in a manner similar to the drain passages.

The main feature of the present invention is to produce a cone or edible container that possesses the feature of preventing melted ice cream from running down the outside walls of the container; and further, to provide a container of this character that can be produced on a commercial scale and that can be nested for packing and shipping as is the usual practice with cones or containers of this character.

It is furthermore desirable to provide an inner cone which projects a considerable distance above the flange 2 so as to avoid any interference when eating the ice cream. Further, to provide an elevated support of this character which will remain effective even though the upper edge of the cone B is bitten away while eating the ice cream. These desirable features are all obtained by the structure here shown.

By molding the cone in two separate parts a commercial product can be obtained. They may be nested and assembled separately for shipment, or they may be assembled in the factory and nested for shipment, as desired.

Another important feature obtained by the structure here shown is the fact that it is impossible to clog or in any way interfere with the drain passages formed between the two cones. Cones have heretofore been made with drain passages formed therein but they have usually been so positioned and arranged that when the ice cream is inserted the passages are filled with the ice cream and as such prevents drainage. This is impossible with the structure here disclosed as the ice cream is packed in the upper end of the cone B and, as the drain passages are a considerable distance below the ice cream, choking or blocking of the drain passages is positively prevented.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

An edible ice cream container comprising a separable lower section and an upper section, said upper section being substantially cone-shaped and said lower section being substantially cone-shaped and terminating at its upper end in an annular trough, a seat formed below the trough to receive the lower end of the upper section, and passages formed between the lower end of the upper section and the seat portion whereby drippings collected by the trough will be drained into the interior of the lower section.

JOSEPH SCHOENFELD.